United States Patent
Kwak et al.

(10) Patent No.: US 10,044,222 B2
(45) Date of Patent: Aug. 7, 2018

(54) APPARATUS AND METHOD FOR MANAGING OF STUDY MODE IN ENERGY MANAGEMENT SYSTEM

(71) Applicant: LSIS CO., LTD., Gyeonggi-do (KR)

(72) Inventors: Jong-Kab Kwak, Gyeonggi-do (KR); Jong-Ho Park, Gyeonggi-do (KR); Yong-Ik Lee, Gyeonggi-do (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 93 days.

(21) Appl. No.: 15/221,470

(22) Filed: Jul. 27, 2016

(65) Prior Publication Data

US 2017/0033601 A1 Feb. 2, 2017

(30) Foreign Application Priority Data

Jul. 29, 2015 (KR) ........................ 10-2015-0107564

(51) Int. Cl.

| | |
|---|---|
| G05B 11/01 | (2006.01) |
| G05B 13/02 | (2006.01) |
| H02J 13/00 | (2006.01) |
| G06F 11/30 | (2006.01) |
| G06Q 50/06 | (2012.01) |
| G06Q 10/06 | (2012.01) |
| G05B 15/02 | (2006.01) |
| G06F 17/30 | (2006.01) |

(52) U.S. Cl.
CPC .............. *H02J 13/00* (2013.01); *G05B 15/02* (2013.01); *G06F 11/3062* (2013.01); *G06F 17/30115* (2013.01); *G06Q 10/06313* (2013.01); *G06Q 50/06* (2013.01)

(58) Field of Classification Search
CPC ...... G05B 17/02; G05B 13/048; G05B 15/02; G05B 13/0265
USPC ............... 700/22, 30, 47, 286, 287, 297
See application file for complete search history.

(56) References Cited

U.S. PATENT DOCUMENTS

| | | | |
|---|---|---|---|
| 7,403,850 B1 | 7/2008 | Boutin et al. | |
| 2007/0294651 A1* | 12/2007 | Tsai | .................... G06F 17/5022 716/102 |
| 2009/0248175 A1* | 10/2009 | Eguchi | .................. G05B 13/048 700/30 |
| 2012/0179447 A1 | 7/2012 | Lin et al. | |

(Continued)

FOREIGN PATENT DOCUMENTS

| | | |
|---|---|---|
| EP | 2857994 A1 | 4/2015 |
| JP | 3058564 B2 | 7/2000 |

(Continued)

OTHER PUBLICATIONS

European Search Report dated Aug. 2, 2016 corresponding to European Application No. 16177197.7-1958.

*Primary Examiner* — Michael J Brown
(74) *Attorney, Agent, or Firm* — K&L Gates LLP (57) ABSTRACT

Disclosed embodiments relate to an apparatus for managing a study mode in an energy management system. In some embodiments, the apparatus includes: a control unit configured to process data collected from a power system and operate an energy management system; a study file creator configured to create a study file based on data being currently operated in the control unit; and a study control unit configured to copy the study file and create a study database for study mode execution.

5 Claims, 6 Drawing Sheets

(56) References Cited

U.S. PATENT DOCUMENTS

2014/0152321 A1     6/2014  Pasek
2014/0210256 A1*    7/2014  Raats .................... H02J 9/00
                                                    307/9.1
2014/0324780 A1    10/2014  Sorenson et al.

FOREIGN PATENT DOCUMENTS

| JP | 2005-168144 A | 6/2005 |
| JP | 4100414 B2 | 6/2008 |
| KR | 10-2009-0046543 A | 12/2009 |
| KR | 10-0934866 B1 | 12/2009 |
| KR | 10-0964296 B1 | 6/2010 |
| KR | 10-0994880 B1 | 11/2010 |
| KR | 10-2015-0053203 A | 5/2015 |

* cited by examiner

FIG. 2

PRIOR ART

APPARATUS AND METHOD FOR MANAGING OF STUDY MODE IN ENERGY MANAGEMENT SYSTEM

CROSS REFERENCE TO RELATED APPLICATIONS

This application claims the benefit of Korean Patent Application No. 10-2015-0107564, filed on Jul. 29, 2015 and entitled "APPARATUS AND METHOD FOR MANAGING OF STUDY MODE IN ENERGY MANAGEMENT SYSTEM", which is hereby incorporated by reference in its entirety.

BACKGROUND

Technical Field

The present disclosure relates to an energy management system and more particularly, to an apparatus and method for creating and managing a database for study mode for system analysis of an energy management system.

Description of the Related Art

Under circumstances of increased government regulation for improvement of energy efficiency and reduction of greenhouse gas, increased burden on energy costs, insufficient supply of power, and so on, there is a rising interest in reducing energy consumption and improving energy efficiency. Although the reduction of energy consumption requires measures which are systematic, sustainable and effective, satisfactory means have not been suggested until now. Therefore, for the purpose of reduction of energy consumption, there is a need of powerful means for determining where and how much energy is consumed, discovering factors of energy dissipation, and finding and fulfilling improvement plans.

As such means, an energy management system (EMS) capable of monitoring and controlling a flow of energy is receiving the global spotlight. The energy management system is an integrated energy management solution capable of optimizing energy consumption by monitoring situations of energy consumption in real time and analyzing an aggregation of data based on hardware, software and ICT-based monitoring and control techniques.

Prior to description on some embodiments, problems on conventional study generation and management will described in detail below with reference to FIGS. 1 and 2.

Figure 1:
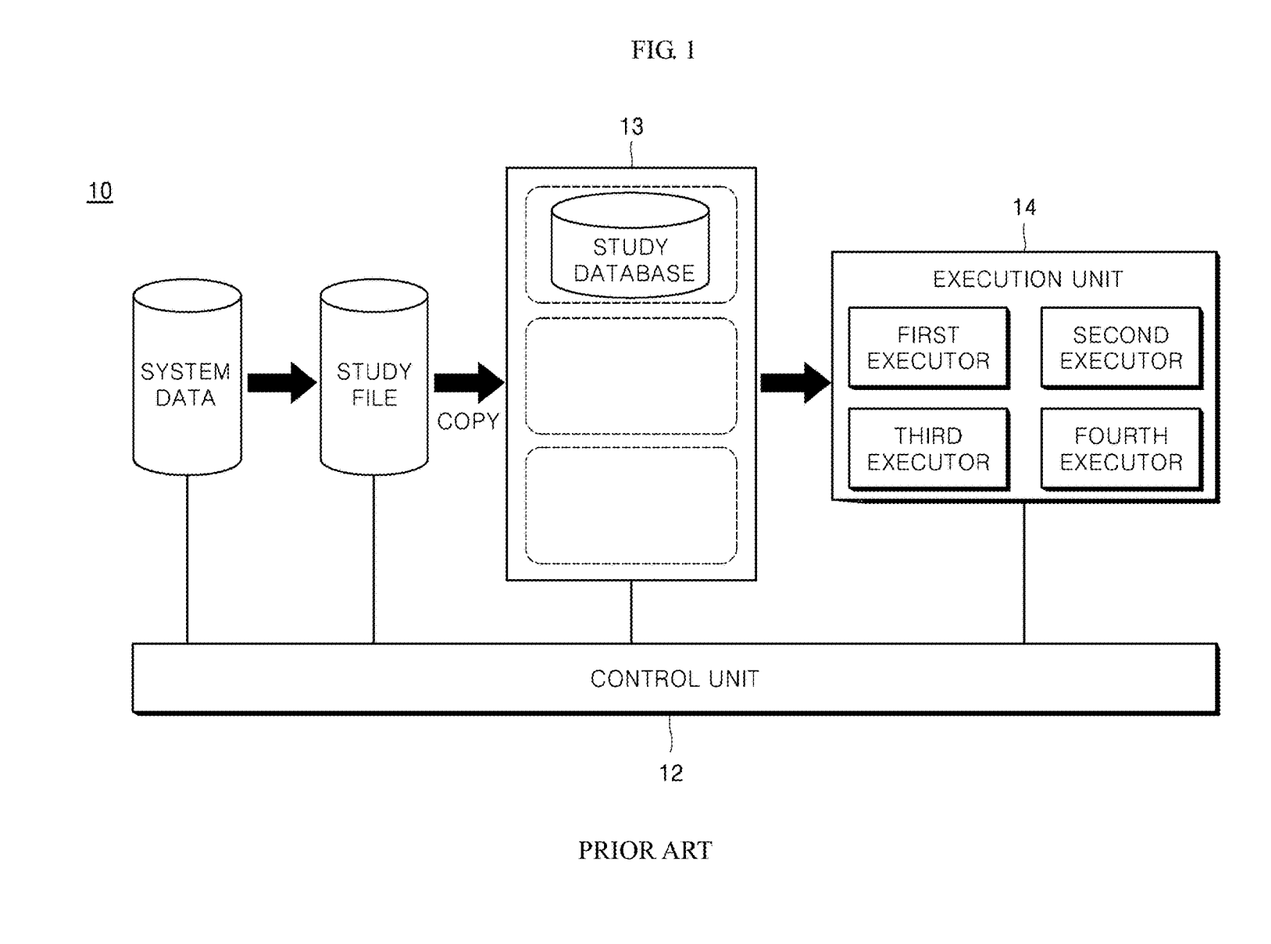
FIG. 1 is a block diagram of a conventional energy management server for generation of a study mode, according to the prior art.

FIG. 1 is a block diagram of a conventional energy management server for generation of a study mode.

Figure 2:
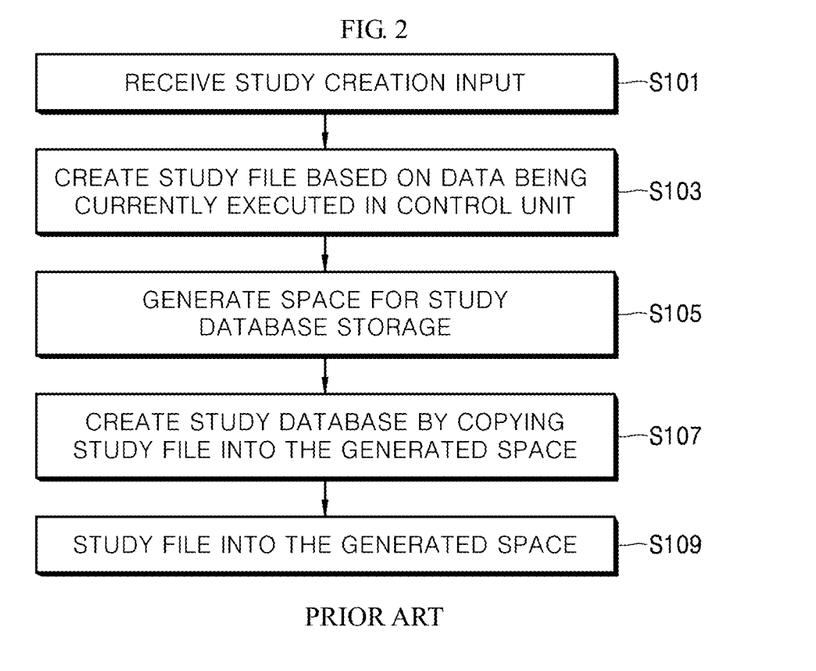
FIG. 2 is a flow chart illustrating a process of generating the study mode in the conventional energy management server, according to the prior art.

FIG. 2 is a flow chart illustrating a process of generating the study mode in the conventional energy management server.

As illustrated in FIG. 1, a conventional energy management server 10 includes only a control unit 12 for controlling the overall operation of the energy management server 10. Therefore, the control unit 12 has a burden of performing a control operation for a study mode while controlling the general energy management system.

In more detail, referring to FIG. 2, the control unit 12 receives an input for study generation from a client 30 (S101).

In response to the input from the client 30, the control unit 12 creates a study file based on system data being currently executed by the control unit 12 (S103). At this time, the study file may be a dump file in a binary format. Specifically, system data being currently operated is required to operate a study mode. However, the system data cannot be, as it is, fetched to a processor for execution of the study mode.

Accordingly, the control unit 12 creates the study file in a format allowing the system data to be copied to a study mode executor.

When the study file is completed to be created, the control unit 12 generates a space for study database storage, in a study database storage unit 13 (S105). At this time, a plurality of spaces for study database storage may be generated.

Once the space for study database storage is generated, the control unit 12 copies the study file into the generated space to create a study database (S107). The created study database has the same values as the system data being currently operated. Accordingly, the created study database can be used to operate the study mode without having an effect on the system under operation.

Once the study database is created, the control unit 12 delivers the created study database to an execution unit 14 (S109). The execution unit 14 may include a plurality of executors which can perform different study modes. Each of the executors may include a plurality of study processes.

However, a task to create a dump file of the system under operation is a task to occupy a load factor of CPU. Therefore, this task imposes a burden on the control unit 12 which has to perform the control of the energy management system quickly in real time.

In addition, there is a problem in that a series of tasks to create a study mode is necessarily in sequential progress. As a result, if a previous step is not completed, the control unit 12 cannot proceed to the next step, which results in inefficient operation of the entire system.

Furthermore, the control unit 12 of the conventional energy management server 10 cannot delete the created study mode and does not offer a creation and deletion procedure of the study mode to the client 30.

SUMMARY

It is an aspect of some embodiments of the present disclosure to provide an apparatus and method for managing a study mode in an energy management system, which is capable of reducing creation time of a study database by distinguishing re-use data from data being operated in the energy management system.

It is another aspect of some embodiments of the present disclosure to provide an apparatus and method for managing a study mode in an energy management system, which is capable of reducing the overall load of the energy management system by separately performing a study file creation task and a memory space generation task for study mode operation.

It is another aspect of some embodiments of the present disclosure to provide an apparatus and method for managing a study mode in an energy management system, which is capable of easily grasping a possible problem by informing a client of present situations of creation and deletion of a study mode through a screen.

In accordance with one aspect of some embodiments of the present disclosure, there is provided an apparatus for managing a study mode in an energy management system, including: a control unit configured to process data collected from a power system and operate an energy management system; a study file creator configured to create a study file based on data being currently operated in the control unit; and a study control unit configured to copy the study file and create a study database for study mode execution.

In some embodiments, the control unit, the study file creator and the study control unit may be operated independently of each other.

In some embodiments, the study file may be a dump file in a binary format.

In some embodiments, the study file creator may compare static data of the collected data with stored re-use data and create the study file based on the re-use data and dynamic data of the collected data if the static data of the collected data matches the re-use data.

In some embodiments, the study file creator may create the study file based on the whole collected data if the static data of the collected data does not match the re-use data.

In some embodiments, the study control unit may generate a plurality of spaces for study database creation in a study database storage unit.

According to some embodiments of the present disclosure, it is possible to provide an apparatus and method for managing a study mode in an energy management system, which is capable of reducing creation time of a study database by distinguishing re-use data from data being operated in the energy management system.

According to some embodiments of the present disclosure, it is possible to provide an apparatus and method for managing a study mode in an energy management system, which is capable of easily grasping a possible problem by informing a client of present situations of creation and deletion of a study mode through a screen.

According to some embodiments of the present disclosure, it is possible to provide an apparatus and method for managing a study mode in an energy management system, which is capable of easily grasping a possible problem by informing a client of present situations of creation and deletion of a study mode through a screen.

DETAILED DESCRIPTION

Hereinafter, embodiments of the present disclosure will be described in detail with reference to the accompanying drawings. It should be understood that the present disclosure is not limited to the following embodiments, and that some embodiments are provided for illustrative purposes only. The scope of the disclosure should be defined only by the accompanying claims and equivalents thereof.

In the following description, the terms "module" and "part," which are suffixes for elements, are given or used alone or in combination for the purpose of facilitating the description, but these terms are not intended to make a distinction between both.

Combinations of blocks in the accompanying drawings and steps in a flow chart may be performed according to computer program instructions. These computer program instructions can be installed in general-purpose computers, special-purpose computers or other processors of programmable data processing equipment. Therefore, the instructions executed by the computers or other processors of programmable data processing equipment create means for performing functions described in blocks in the drawings or in steps in the flow chart. These computer program instructions can be stored in computer-usable or computer-readable memories which can assist in the computers or other processors of programmable data processing equipment to implement particular functions in particular manners. Therefore, the instructions stored in the computer-usable or computer-readable memories can be used to make products containing instruction means for performing the functions described in the blocks in the drawings or in the steps in the flow chart. The computer program instructions can also be installed in the computers or other processors of programmable data processing equipment. Therefore, a sequence of operation steps can be performed on the computers or other processors of programmable data processing equipment to produce computer-executable processes. In addition, the instructions operating the computers or other processors of programmable data processing equipment can provide steps for executing the functions described in the blocks in the drawings or in the steps in the flow chart.

In addition, the blocks or the steps may represent portions of modules, segments or codes including one or more executable instructions for executing a specified logical function(s). In addition, in some alternative embodiments, it should be noted that the functions described in the blocks or steps may be performed out of a specified sequence. For example, two successive blocks or steps may be performed substantially at once or may be sometimes performed in a reverse order depending on a corresponding function.

An energy management system is an integrated power management system for producing electric power economically and supplying it stably. The energy management system includes a power generation planning function of automatically predicting power generation and demand, controlling the power generation capacity, and calculating economic dispatch and optimal power flow. In addition, the energy management system includes a power system analysis function of interpreting and analyzing static and dynamic characteristics of a power system or power equipment and finding the optimal configuration and operation plan of the power system.

The analysis function of the power system may include a function called a study mode of checking a system under current operation by duplicating this system in the same physical equipment and generating a test or event on simulation. The study mode must be able to copy data of the system under current operation in real time without missing and should not include an effect on the system under current operation. In addition, a process executed in the study mode may be managed apart from the system and should not include an effect on the system.

Hereinafter, some embodiments of the present disclosure will be described in detail with reference to the drawings.

Figure 3:
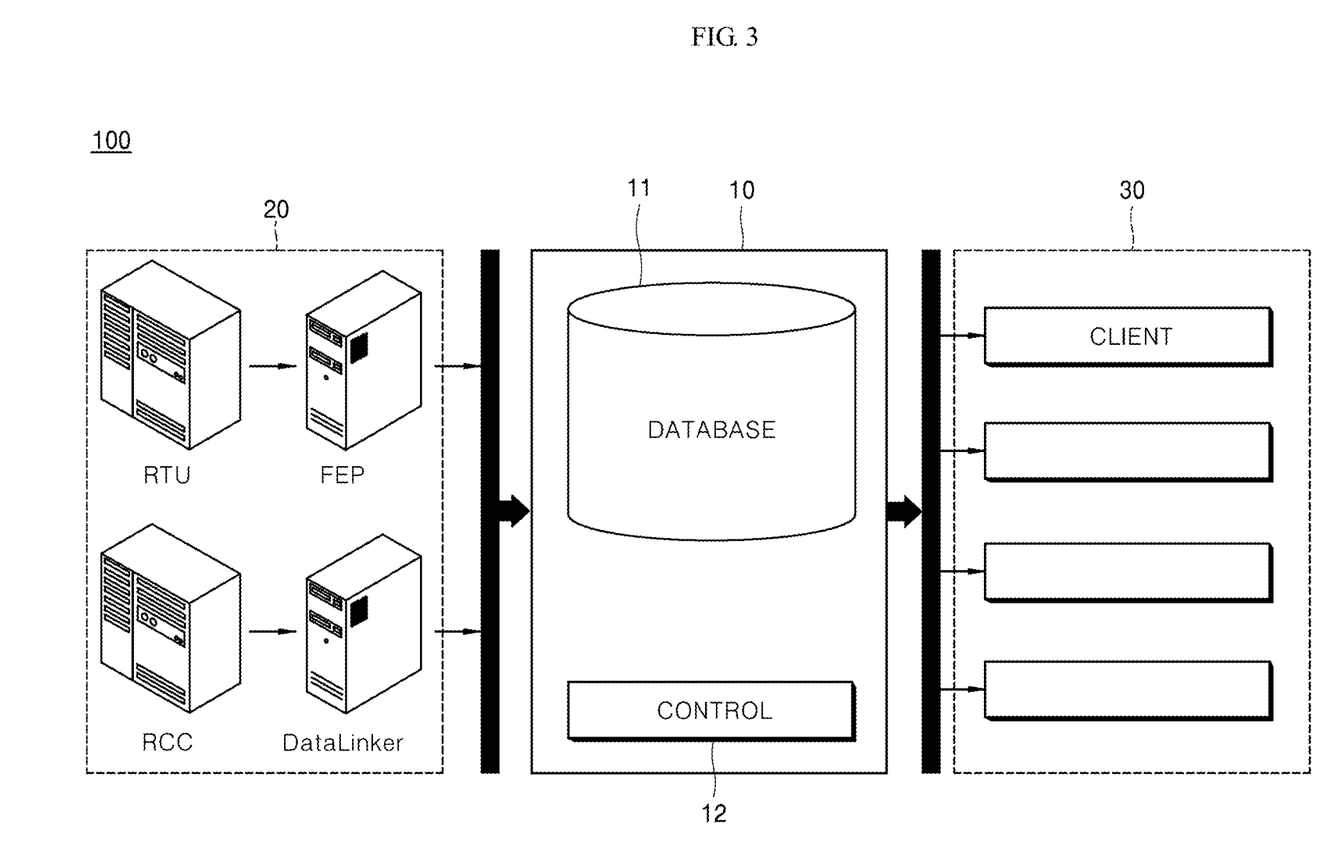
FIG. 3 is a block diagram illustrating the configuration of an energy management system according to some embodiments of the present disclosure.

FIG. 3 is a block diagram illustrating the configuration of an energy management system according to some embodiments of the present disclosure.

Referring to FIG. 3, an energy management system 100 according to some embodiments of the present disclosure may include an energy management server 10, a client 30 and a power system 20.

The energy management server 10 can receive data from the power system 20 and create the data in the form of a database. In addition, the energy management server 10 can provide the database to the client 30. In addition, the energy management server 10 can manage and control the power system 20. The energy management server 10 may be connected to a plurality of clients 30. In addition, the energy management server 10 may include a dual structure.

The energy management server 10 may include a database 11 and a control unit 12.

The database 11 can collect/store measurement data received from the power system 20 and store operational data based on the measurement data for each predetermined period. In addition, the database 11 can automatically create and store a list of measurement and operational data and store a list of policy data.

The control unit 12 can control the overall operation of the energy management server 10. In some embodiments, the control unit 12 can create the database 11 by processing data delivered from the power system 20. In other embodiments, the control unit 12 can provide specified data to the client 30 at a request from the client 30.

Hereinafter, some embodiments of the present disclosure capable of solving the above-described problems will be described with reference to FIGS. 4 to 6.

Figure 4:
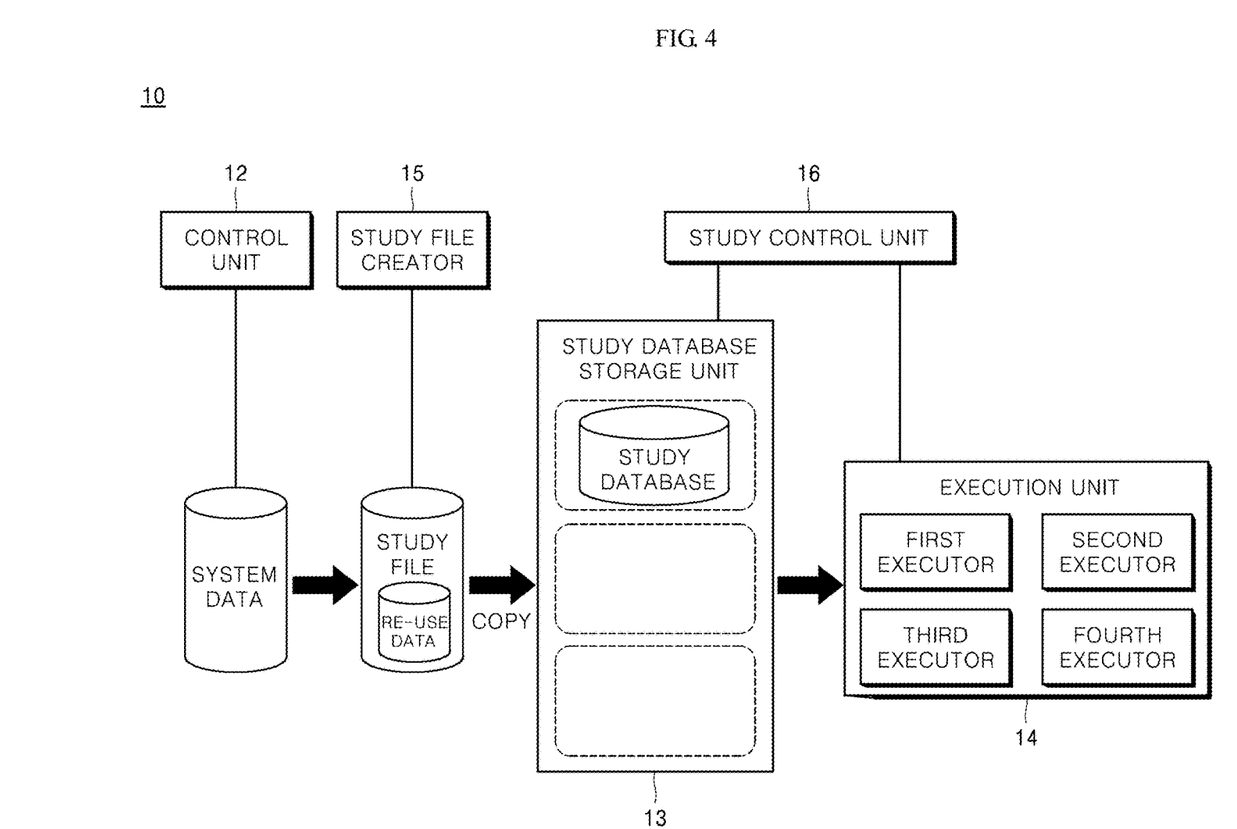
FIG. 4 is a block diagram of an energy management server for study mode creation and management according to some embodiments of the present disclosure.

FIG. 4 is a block diagram of an energy management server for study mode creation and management according to some embodiments of the present disclosure.

Referring to FIG. 4, the energy management server 10 for study mode creation and management includes the control unit 12 shown in FIG. 2, a study file creator 15 and a study control unit 16.

The study file creator 15 creates a study file based on system data being operated by the control unit 12. The study file creator 15 is configured independently of the control unit 12 and can create the study file at a request from the client 30 irrespective of the operation of the control unit 12.

The study control unit 16 creates a study database by copying the study file. In addition, the study control unit 16 generates a space for storing the study database, in a study database storage unit 13. In addition, the study control unit 16 controls an operation of an executor using the study database. Likewise, the study control unit 16 is configured independently of the control unit 12 and can create and manage a study mode at a request from the client 30 irrespective of the operation of the control unit 12.

Accordingly, the study file creator 15 and the study control unit 16 are configured separately from the control unit 12 and can perform an operation for study mode creation and management independently of the system operation of the control unit 12. As a result, the energy management system according to some embodiments of the present disclosure can reduce the overall load dependent on the execution of the study mode and can execute the study mode without including an effect on the existing energy management system.

Hereinafter, the operation of the energy management server 10 of FIG. 4 will be described in more detail.

Figure 5:
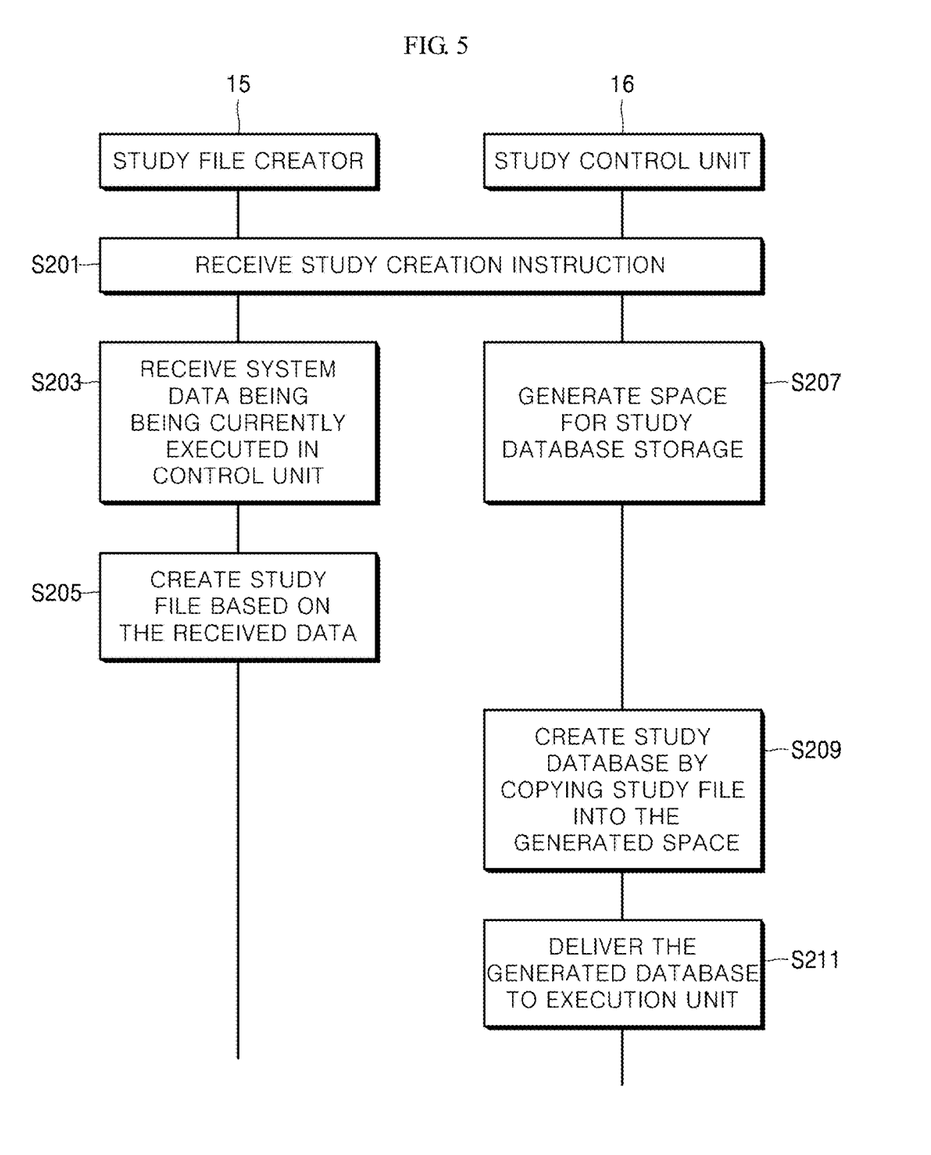
FIG. 5 is a flow chart illustrating an operation of the energy management server according to some embodiments of the present disclosure.

FIG. 5 is a flow chart illustrating the operation of the energy management server 10 according to some embodiments of the present disclosure.

The study file creator 15 and the study control unit 16 receive a study creation instruction from the client 30 (S201). In some embodiments, both of the study file creator 15 and the study control unit 16 can receive the study creation instruction. In an alternate embodiment, the study control unit 16 can receive the study creation instruction and control the operation of the study file creator.

The study file creator 15 receives system data being currently executed by the control unit 12 (S203). The study mode is intended to use data being currently operated in the system to study a variety of situations. The study file creator 15 receives the system data being used in the control unit 12.

The study file creator 15 creates a study file based on the received data (S205). The data being used in the control unit 12 cannot be directly fetched for study execution. Accordingly, the study file creator 15 creates the study file in the format of a dump file, as an intermediate step for creating a database for study execution.

When the study file is created, the study file creator 15 can use re-use data to create the study file. The re-use data used at this time may be static data which are fixed and unchanged in the study file. For example, the re-use data may be data on a place name of a power plant.

If the study file creator 15 creates the whole received system data in the form of a study file at all times, the size of the system data may be increased, which may cause a problem. Accordingly, the study file creator 15 can store the static data as the re-use data and create a portion other than the re-use data as a study file in order to reduce a load.

Hereinafter, a detailed study file creation procedure will be described with reference to FIG. 6.

Figure 6:
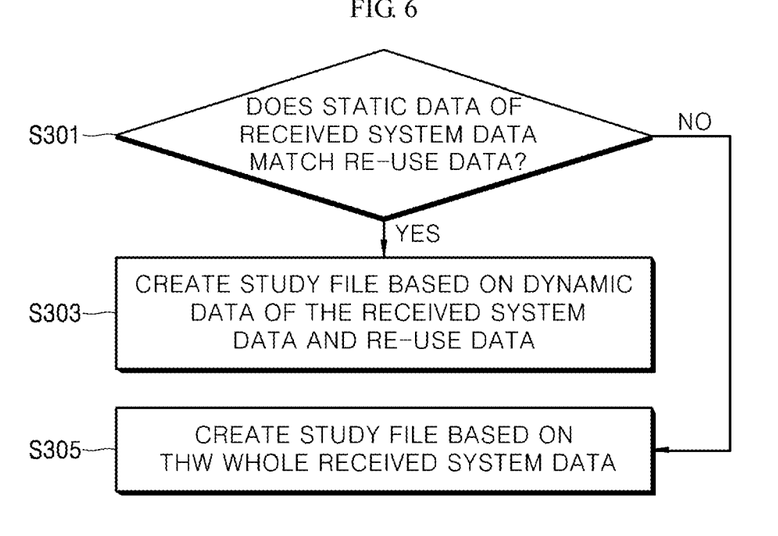
FIG. 6 is a flow chart illustrating an operation of using a re-use file to create a study file, according to some embodiments of the present disclosure.

FIG. 6 is a flow chart for explaining an operation of using a re-use file to create a study file.

The study file creator 15 determines whether or not static data of the received system data matches stored re-use data (S301). Specifically, the system data may include static data and dynamic data. As one example, the dynamic data may be power, current or voltage. As one example, the static data may be a location or power generation capacity of a power feeder. In other words, the static data may be little varied and the dynamic data may be frequently varied.

Incidentally, a static data item and a dynamic data item can be distinguished from each other and may be stationary. Accordingly, the study file creator 15 can compare the static data item with the re-use data to determine whether or not they match each other.

In some embodiments, the study file creator 15 can determine whether or not the static data matches the stored re-use data in correspondence to a change period for each static data item.

In more detail, without comparing all dynamic data with stored re-use data every time the study file creator 15 receives the system data, the study file creator 15 may compare the static data with the stored re-use data in accordance to the change period for each static data item.

For example, the study file creator 15 can determine whether power per hour generated in a power feeder, of the dynamic data, matches the stored re-use data for each set period.

If they match each other, the study file creator 15 creates a study file based on the re-use data and the dynamic data of the received system data (S303). Specifically, the re-use data and the dynamic data can be combined to create a single study file. The created study file may include a file header signaling the data. The file header can signal that the study file contain the re-use data. In addition, the study file can contain the re-use data and the dynamic data which are distinguished from each other. In addition, the re-use data and the dynamic data may be fixed at their respective locations.

If they match each other, the study file creator 15 creates a study file based on the whole received system data (S305). Specifically, when the static data is different from the dynamic data, the re-use data includes no room for use and accordingly the study file creator 15 creates a complete study file. The study file created in the same way may include a file header signaling the data. The file header can signal that the study file contain no re-use data.

Returning to FIG. 5, the study control unit 16 generates a space for study database storage independently of the operation of the study file creator 15 (S207). In this case, the study database may be a set of data used to execute the study mode. However, this data set is only for the purpose of execution of the study mode and is irrespective of the operation of an actual energy management system.

The study control unit 16 can generate a plurality of storage spaces. A plurality of study modes may exist and accordingly the number of study databases required may be one or more. In addition, since one study mode may include a plurality of execution processes, the number of study databases required may be one or more.

The study control unit 16 creates the study database by copying the study file into the generated space (S209).

The study control unit 16 delivers the created study database to the executor 14 (S211).

At this time, the study control unit 16 can inform the client 30 that the study mode execution includes been ready as the study database is delivered to the executor 14. In addition, the study control unit 16 can provide the client 30 with information of identifier, creation time and end time of the created study mode through a screen. Further, the study control unit 16 can provide the client 30 with information on deletion of the created study mode.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions and changes in the form of some embodiments described herein may be made without departing from the spirit of the disclosures. The accompanying claims and their equivalents are intended to cover such forms or modifications as would fall within the scope and spirit of the disclosures. Various components illustrated in the figures may be implemented as hardware and/or software and/or firmware on a processor, ASIC/FPGA, dedicated hardware, and/or logic circuitry. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. An apparatus for managing a study mode in an energy management system, comprising:
    a control unit configured to process data collected from a power system and operate an energy management system;
    a study file creator configured to create a study file based on system data being currently operated in the control unit, wherein the system data includes static data and dynamic data which is frequently varied; and
    a study control unit configured to copy the study file and create a study database for study mode execution, wherein the study file creator stores the static data which is fixed and unchanged in the study file as re-use data,
    wherein the study file creator is further configured to:
        compare the static data of the system data with the stored re-use data without comparing the dynamic data with the re-use data, and
        create the study file based on the re-use data and the dynamic data of the system data if the static data of the system data matches the re-use data.

2. The apparatus according to claim 1, wherein the control unit, the study file creator and the study control unit are operated independently of each other.

3. The apparatus according to claim 2, wherein the study file creator creates the study file based on the whole collected data if the static data of the collected data does not match the re-use data.

4. The apparatus according to claim 2, wherein the study control unit generates a plurality of spaces for study database creation in a study database storage unit.

5. The apparatus according to claim 1, wherein the study file is a dump file in a binary format.

* * * * *